US006438586B1

(12) United States Patent
Hass et al.

(10) Patent No.: US 6,438,586 B1
(45) Date of Patent: *Aug. 20, 2002

(54) FILE TRANSFER UTILITY WHICH EMPLOYS AN INTERMEDIATE DATA STORAGE SYSTEM

(75) Inventors: Yeshayahu Hass, Neot-Shoshanim (IL); Natan Vishlitzky, Brookline; Yoav Raz, Newton, both of MA (US)

(73) Assignee: EMC Corporation, Hopkinton, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/723,137

(22) Filed: Sep. 30, 1996

(51) Int. Cl.[7] .............................................. G06F 15/167
(52) U.S. Cl. .................................... 709/213; 710/39
(58) Field of Search ........................... 395/200.01, 325, 395/145, 673, 658; 371/11; 364/200, 900; 709/251, 227, 230, 103, 213; 707/8, 201, 505; 710/5, 39, 128, 152; 700/5; 703/6; 717/4; 712/1; 714/15

(56) References Cited

U.S. PATENT DOCUMENTS

| 4,634,110 | A | * | 1/1987 | Julich et al. .................. 371/11 |
|---|---|---|---|---|
| 5,056,003 | A | * | 10/1991 | Hammer et al. ............. 364/200 |
| 5,191,652 | A | * | 3/1993 | Dias et al. ................... 709/251 |
| 5,247,618 | A | * | 9/1993 | Davis et al. ................. 395/275 |
| 5,251,318 | A | * | 10/1993 | Nitta et al. .................. 710/152 |
| 5,257,374 | A | * | 10/1993 | Hammer et al. ............. 709/105 |
| 5,442,785 | A | * | 8/1995 | Roffe et al. .................. 395/658 |
| 5,509,122 | A | * | 4/1996 | Bartow et al. ............... 709/227 |
| 5,617,537 | A | * | 4/1997 | Yamada et al. ......... 395/200.01 |
| 5,628,005 | A | * | 5/1997 | Hurvig ........................... 707/8 |
| 5,649,092 | A | * | 7/1997 | Price et al. .................... 714/15 |
| 5,673,394 | A | * | 9/1997 | Fenwick et al. ........ 395/200.08 |
| 5,682,507 | A | * | 10/1997 | Phillips et al. ......... 395/200.08 |
| 5,757,642 | A | * | 5/1998 | Jones ............................. 700/5 |
| 5,778,225 | A | * | 7/1998 | Supernaw-Issen et al. .. 709/103 |
| 5,819,054 | A | * | 10/1998 | Ninomiya et al. ........... 710/128 |
| 5,845,147 | A | * | 12/1998 | Vishlitzky et al. ............. 710/5 |
| 5,887,180 | A | * | 3/1999 | Keh et al. ....................... 712/1 |
| 5,906,658 | A | * | 5/1999 | Raz .............................. 710/39 |
| 6,108,704 | A | * | 8/2000 | Hutton et al. ................ 709/227 |
| 6,273,622 | B1 | * | 8/2001 | Ben-David .................. 709/230 |

FOREIGN PATENT DOCUMENTS

EP 0 646 876 A1 4/1995 ........... G06F/15/16

OTHER PUBLICATIONS

Ha et al, A Hybrid Cache Coherence Protocol for a Decoupled Multi–channel Optical Nework: Speed Dmon. IEEE 1996.*

Komada et al, The EM–X Parallel Computer: Architecture and Basic PErformance, IEEE 1995.*

* cited by examiner

*Primary Examiner*—Mark H. Rinehart
*Assistant Examiner*—Thong Vu
(74) *Attorney, Agent, or Firm*—John M. Gunther; Leanne J. Fitzgerald; Robert Kevin Perkins

(57) ABSTRACT

A method of communicating between first and second processes running on a plurality of host processors that are connected to a data storage system, the method including the steps of establishing a connection between the first and second processes through the data storage system; and by using the connection established through the data storage system, sending information between the first and second processes.

19 Claims, 13 Drawing Sheets

| Field Name | Field Usage |
| --- | --- |
| blk5_id | Block identifier, set to "MAS_EMC" on master device. Copies are also written to secondary devices with id set to "SEC_EMC" |
| blk5_dev_id | Entry number of master device in device table |
| blk5_seq_size | Size of transfer segment in blocks |
| blk5_version | Master Control Block structure version number |
| blk5_time_id | Creation time of master block |
| blk5_tot_seg_num | Total number of transfer segments |
| blk5_process_id_table_ptr | Pointer to start of process id table structure |
| blk5_secondary_device_entrynum | Number of entries in secondary device table |
| blk5_start_process_segment_ptr | Pointer to process segment pointer table structures |
| blk5_max_connections | Maximum number of connections allowed |
| blk5_mast_sec_start_ptr | Pointer to process segment pointer table structures |
| blk5_mast_sec_start_segment_ptr | Pointer to start of data segments |
| blk5_ptr_seg_per_process | Number of segments per process , (connection) |
| blk5_maxptr | Maximum number of segments per process |
| blk5_unix_filename | UNIX file name of master device |

FIG. 4

| Field Name | Field Usage |
|---|---|
| pro-process-id | Process (connection)id(=slot number) |
| pro_flag_process | Process flag field |
| pro_con_rc_ | Status code |
| pro_requestor | Name of requestor (initiator) process |
| pro_requestor_password | Password for requestor process |
| pro_requestor_type | OS Type of requestor |
| pro_requestee | Name of requestee (connector) process |
| pro_requestee_type | OS Type of requestee |
| pro_dtd | Command structure for initiator to connector comm. |
| InitM | Command structure for connector to initiator comm. |

FIG. 5

| Field Name | Field Usage |
|---|---|
| sec_dev_id | Device id (from configuration file) |
| sec_str_seg_ptr | Pointer to start of data segments for the device |
| sec_seg_number_for_device | Number of data segments on the device |
| sec_start_segment_number | Segment number of first segment on device (with the first segment on the first device being segment number 1) |

FIG. 6

| Field Name | Field Usage |
|---|---|
| ptr_process_segment_ptr | Starting block of data segment on disk |
| ptr_process_segment_flg | Segment status flag |
| ptr_process_block_seq | Segment sequence number |
| ptr_process_req_id | Process request sequence number |
| ptr_process_blk_read | Size of segment in blocks |

FIG. 7

FILE TRANSFER UTILITY WHICH EMPLOYS AN INTERMEDIATE DATA STORAGE SYSTEM

BACKGROUND OF THE INVENTION

The invention relates generally to mechanism for transferring information between processes typically running on different host processors.

File transfers between computers are commonly done using communication protocol over a computer network. If the network is the Internet, one application protocol which is particularly popular referred to as ftp (file transfer protocol). Typically, the user or process that wants to send or retrieve a file from a remote computer invokes the file transfer protocol. In general, the user's ftp command opens a control channel over the network to the remote or target machine. Then through the use of various commands, e.g. put and get commands, the user can send a file to or retrieve a file from the remote machine. According to the ftp protocol, the actual file transfer takes place over a separate data channel that is different from the control channel.

A general characteristic of ftp and other similar file or data transfer protocols is that the machines are linked together over a common computer network. The connection to that network can be temporary and established solely for the purpose of the transfer or it can be a connection which is more permanent and which exists for other computing and communication purposes.

SUMMARY OF THE INVENTION

In general, in one aspect, the invention is a method of communicating between first and second processes running on a plurality of host processors that are connected to a data storage system. The method includes the steps of establishing a connection between the first and second processes through the data storage system; and by using the connection established through the data storage system, transferring information between the first and second processes.

Preferred embodiments include the following features. The method further includes defining a shared storage region within the data storage system and performing the establishing and sending steps through the shared storage region. The method also includes defining areas within the shared storage region that are used to implement a set of control structures and a plurality of transfer buffers, and the step of establishing the connection between the first and second processes includes using the set of control structures to establish the connection and the step of transferring information between the first and second processes uses the plurality of transfer buffers. In a data storage system which includes a cache memory, a disk storage unit, and a controller which destages data from the cache memory into the disk storage unit, the method further involves using the cache memory for establishing the connection and sending information; and disabling the destaging function of the controller for the shared storage region. The step of transferring information through the transfer buffers includes the steps of using the first process to write data to the plurality of transfer buffers; using the second process to read data that was written to the transfer buffers; and using the control structures to synchronize the writing and reading operations.

In general, in another aspect, the invention is a method of transferring information in a system that includes a plurality of host processors that are connected to a common data storage system and that share a region of storage within the data storage system. The method includes the steps of defining areas within the shared storage region that are used to implement a set of control structures and a plurality of transfer buffers; using the control structures to establish a connection between a first process and a second process through the shared memory of the data storage system, wherein the first and second processes are running on the plurality of host processors; and after establishing the connection, transferring information between the first process and the second process through the transfer buffers. The step of transferring information through the transfer buffers includes the steps of: through the first process, writing data to the plurality of transfer buffers; through the second process, reading data that was written to the transfer buffers; and using the control structures to synchronize the writing and reading steps.

Preferred embodiments include the following features. The set of control structures includes a first data structure and a second data structure, and the step of establishing a connection uses the first data structure and the step of using the control structures to synchronize the writing and reading uses the second data structure. The step of establishing a connection involves adding identifiers of the first and second processes to the first data structure; and setting a first flag in the first data structure to indicate that a connection is being requested by the first process of the second process. The step of establishing a connection further involves, prior to the adding and setting steps, reading the first data structure from the shared memory into a first local memory of the host processor on which the first process is running; and after the adding and setting steps, writing the first data structure back to the shared memory. Also, the step of establishing a connection further involves, prior to reading the first data structure from the shared memory into the first local memory, locking a portion of shared memory in which the first data structure is stored; after writing the first data structure back to the shared memory, unlocking the portion of shared memory in which the first data structure is stored.

Also in preferred embodiments, the second data structure includes a first table that includes a plurality of records each of which identifies a corresponding transfer buffer in the plurality of transfer buffers and the step of using the control structures to synchronize the writing and reading steps involves selecting a record among the plurality of records; and performing a first sequence of steps including determining whether the transfer buffer which corresponds to the selected record is available to receive data; if the transfer buffer which corresponds to the selected record is available to receive data, causing the first process to perform the step of writing data to the plurality of transfers buffer by writing data to the transfer buffer which corresponds the to selected record; and setting a first flag in the selected record to indicate that data has been written to that transfer buffer which corresponds to the selected record. The method also includes selecting a next record among the plurality of records in the first table and for the next selected record performing the first sequence of steps. The method also includes repeating the steps of selecting a next record and performing the first sequence of steps until all data that is available for transfer has been written to the plurality of transfer buffers. The step of using the control structures to synchronize the writing and reading steps further includes the steps of through the second process, polling the first table to determine when the first flag has been set; upon detecting that the first flag has been set, causing the second process to perform the step of reading data that was written to the transfer buffers by reading the data that was written to the transfer buffer which corresponds to the selected record; and setting a second flag in the second data structure to indicate that the second process has read the data that was written to the transfer buffer which corresponds to the selected record.

In general, in yet another aspect, the invention is a data storage system for handling a file transfer between a first process and a second process, each of which is running on a selected one of a plurality of host processors that are connected to the data storage system. The data storage system includes a shared storage region to which both the first and second processes share access; a set of control structures implemented in the shared storage region; and a plurality of transfer buffers implemented in said shared memory. The set of control structures includes a first table which serves to establish a connection between the first and second processes through the shared memory, and a second table which serves to coordinate use of the plurality of transfer buffers.

In general, in still another aspect, the invention is a computer program residing on a computer-readable medium. The program is for running on a first host system which is connected to a data storage system to which a second host system is also connected. The data storage system includes a shared storage region that is shared by both the first and second host systems. The program includes instructions enabling a first process that is running on the first host system to perform the functions of: requesting a connection through the shared storage region in the data storage system to a second process running on the second host system; and using the connection through the shared storage region to transfer information between the first and second processes.

In general, in still yet another aspect, the invention is a computer program residing on a computer-readable medium, the program including instructions for causing the first host system to perform the functions of: detecting that a connection through the shared storage region in the data storage system is being requested by a process running on the second host system; writing an acknowledgment to the shared storage region accepting the connection; and using the connection through the shared storage region to transfer information between the first and second processes.

The File Transfer System (FTS) provides a high bandwidth file transfer capability using an integrated cache disk array (ICDA) that includes one or more disks that are shared between multiple systems as the transfer mechanism. Files can be transferred between systems with different hardware and OS types.

Other advantages and features will become apparent from the following description of the preferred embodiment and from the claims.

BRIEF DESCRIPTION OF THE DRAWINGS
AND THE APPENDIX

FIG. 4 shows the structure of Master Control Block data structure;

FIG. 5 shows the structure of the Process Id Table;

FIG. 6 shows the structure of the Secondary Device Table;

FIG. 7 shows the structure of the Process Segment Pointer Table;

Appendix A shows a relevant subset of the commands that are supported by the FTS.

DESCRIPTION OF THE PREFERRED
EMBODIMENTS

Figure 1:
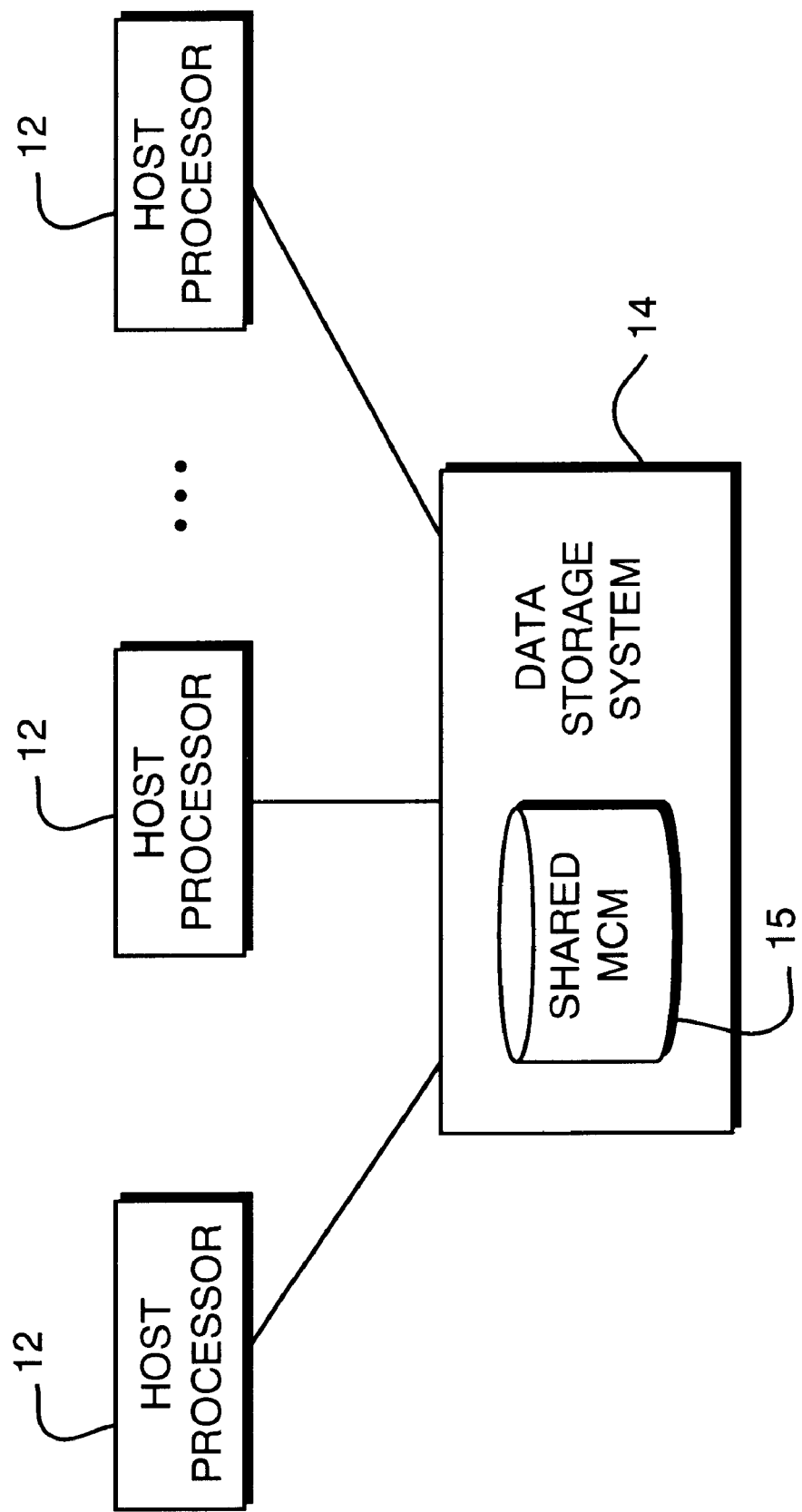
FIG. 1 is a block diagram of a typical system in which the file transfer utility is implemented.

Referring to FIG. 1, a system which embodies the invention includes a plurality of host processors 12 that are connected to a central data storage system 14. Host processors 12 are digital processing units which include one or more CPU's and main memory. They might be, for example, PC's, workstations, symmetric multiprocessors (SMPs) or a massively parallel processor (MPP), which has many CPU's.

In general, data storage system 14 contains a shared memory 17 that is accessible to all of the host processors that are connected to the system. The control structures and transfer buffers that are stored in the shared memory provide a mechanism by which one host processor can transfer files to and receive files from another host processor that is connected to the data storage system.

Figure 2:
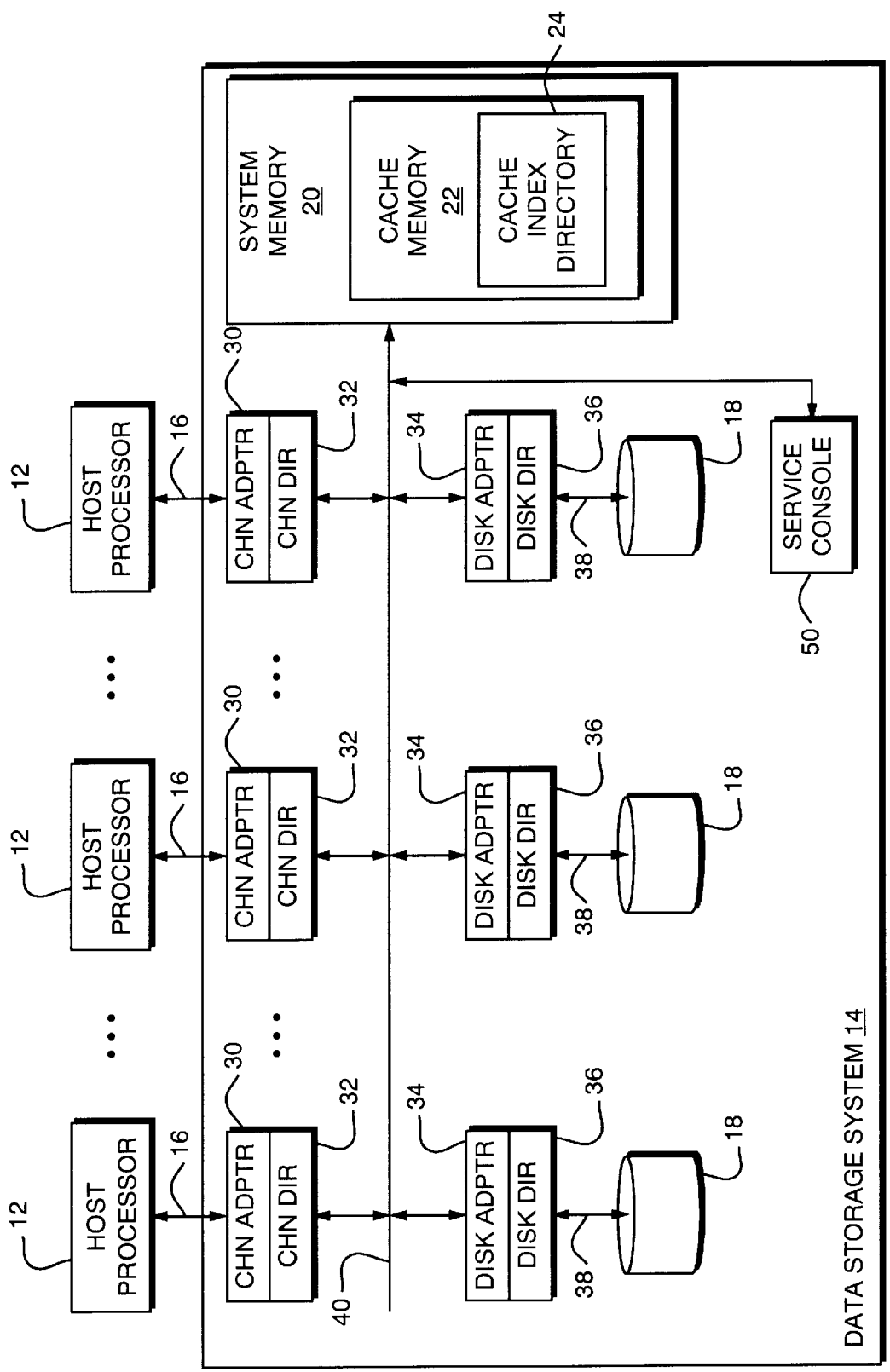
FIG. 2 is a block diagram showing the internal structure of a data storage system such as might be used in the system of FIG. 1.

Referring to FIG. 2, host processors 12 are each connected to data storage system 14 through respective host connections 16. To simplify the discussion, only a single host connection is shown for each host processor. It should be understood, however, that there could in fact be multiple connections between the data storage system and a processor.

Data storage system 14 contains the physical memory in which data is stored. The particular manner in which the physical memory within storage system is implemented and how it is partitioned is not of central importance. Examples of commercially available products that can be used to implement data storage system 14 are the Symmetrix 5XXX™ series family of products from EMC Corporation of Hopkinton, Mass., which are high performance integrated cache disk arrays designed for online data storage. The following details about the internal structure and operation of data storage system 14 generally apply to the Symmetrix™ data storage systems. However, it should be understood that other designs known to persons skilled in the art may also be used to implement data storage system 14.

Data storage system 14 includes multiple arrays of disk devices 18 and a system memory 20. A portion of system memory implements cache memory 22. The multiple arrays of disk devices 18 provide a non-volatile data storage area and cache memory 22 provides a volatile data storage area. Each disk device 18 includes a head-disk assembly, a microprocessor, and a data buffer which enables the data storage system to provide for parallel processing of data. In the described embodiment, system memory 20 is implemented by high-speed random-access semiconductor memory. Within cache memory 22 there is a cache index directory 24 which provides an indication of what data is stored in cache memory 22 and the address of that data in cache memory 22. Cache index directory 24 is organized as a hierarchy of tables for devices, cylinders, and tracks of data records, as further described in U.S. Pat. No. 5,206,939, issued Apr. 27, 1993, and incorporated herein by reference.

In general, there is a group of channel adapters 30 and channel directors 32 that provide interfaces through which host processors 12 connect to data storage system 14. Each channel adapter 30 provides for direct attachment to the physical host connections. Channel director 32 contains a microprocessor that processes commands and data from host processors 12 and manages accesses to cache memory 22. Channel director 32 handles I/O requests from host processors 12. It uses cache index directory 24 which is stored in cache memory 22 to determine whether the request can be satisfied out of the cache or whether the data must be obtained from disk devices 18. It maintains data in cache memory based on the data access patterns. Channel directors 32 write data from host processors 12 into cache memory 22 and update cache index directory 24. They also access cache index directory 24 and read data from cache memory 22 for transfer to host processors 12.

There is also a disk adapter 34 and a disk director 36 through which each disk device array 18 is connected to cache memory 22. Disk adapter 34 interfaces to multiple SCSI buses 38 to which disk device arrays 18 are connected. Disk director 36 manages accesses to the disks within disk device arrays 18. Disk Director 36 stages data from the disk device arrays to cache memory 22 and it updates cache index directory 24, accordingly. It also de-stages or writes-back data from "written-to" blocks in cache memory 22 to the disk device arrays and again updates cache index directory 24, accordingly.

Disk adapters 34 and channel adapters 30 access system memory 20 through a high-speed, parallel line system bus 40. System memory 20 is implemented by multiple memory boards. Only one access to any given memory board may occur at any given time, however, multiple memory boards may be accessed at the same time to support concurrent operations.

Data storage system 14 can be configured into multiple logical volumes. Typically, a volume corresponds to a single disk device. A service console 50 within data storage system 14 enables the user to configure the data storage, i.e., to define the logical volumes and to specify which logical volumes are accessible through which host connections 16. In the described embodiment, at least one volume is used to implement the file transfer mechanism that is described on greater detail below. That logical volume is configured as a shared volume that is accessible through all host connections 16. Host processors 12 use the shared volume as a transfer buffer through which files are transferred to other host processors connected to the data storage system.

Note that data storage system 14 also includes additional functionality and features which are typically found in such system. For example, data storage system 14 also includes a lock manager which coordinates write accesses to logical volumes. Because such functionality and features are known to persons skilled in the art they will not be described here.

Basic Mechanisms

In the case of the Symmetrix, a large number of hosts (e.g. 16–32) can connect to the unit. It also enables one to mix mainframes and standard SCSI (i.e., open systems). Within the Symmetrix, the software controls the allocation of disks to the various ports to which host system are connected. It is possible in the software to map the same disk drive(s) to multiple ports. In fact, one can map it to an arbitrary number of ports up to the full capacity of the system (e.g. 16–32). The file transfer system (FTS) described herein takes advantage of these capabilities to implement a set of shared on-disk control and buffer structures and a protocol for transferring files between systems.

The FTS includes a software utility that transfers files between one host processor and another host processor. Since both open systems and mainframe systems can be connected to the Symmetrix, the FTS enables users to transfer files at high speed between MVS-based systems and UNIX®-based systems. The FTS, which uses the ICDA and the high speed cache for file transfers, requires at least one shared disk for control structures and transfer buffers. For added "bandwidth," additional disks can be allocated for data transfer buffers, spreading the I/O load across multiple devices and potentially across multiple ports. The disk holding the control structures is called the master disk. Any additional disks are called secondary transfer disks.

The control structures on the master disk, which are in addition to the transfer buffers, consist of a Master Control Block (FIG. 4), a Process Id Table (FIG. 5), a Secondary Device Table (FIG. 6), and a Process Segment Pointer Table (FIG. 7). The FTS protocol is designed so that the only structure requiring access control is the Process ID table, which is used to allocate resources for multiple transfer operations. Contention is thus limited to the allocate and deallocate operations. Since the allocate and de-allocate operations are relatively infrequent, compared to the operations for file transfer, contention for the master device is thus kept to a minimum by this approach.

A file transfer is implemented by using two processes, one process is running on the system that initiates the file transfer request, called the initiator, and the other process is running on the system that responds to the file transfer request, called the connector. The processes coordinate the transfer by writing and reading to the control structures and transfer buffers. SCSI reserve and release operations are used when writing to the Process Id Table to prevent dirty reads. Both processes poll the master device if data is not available.

Architecture

Figure 3:
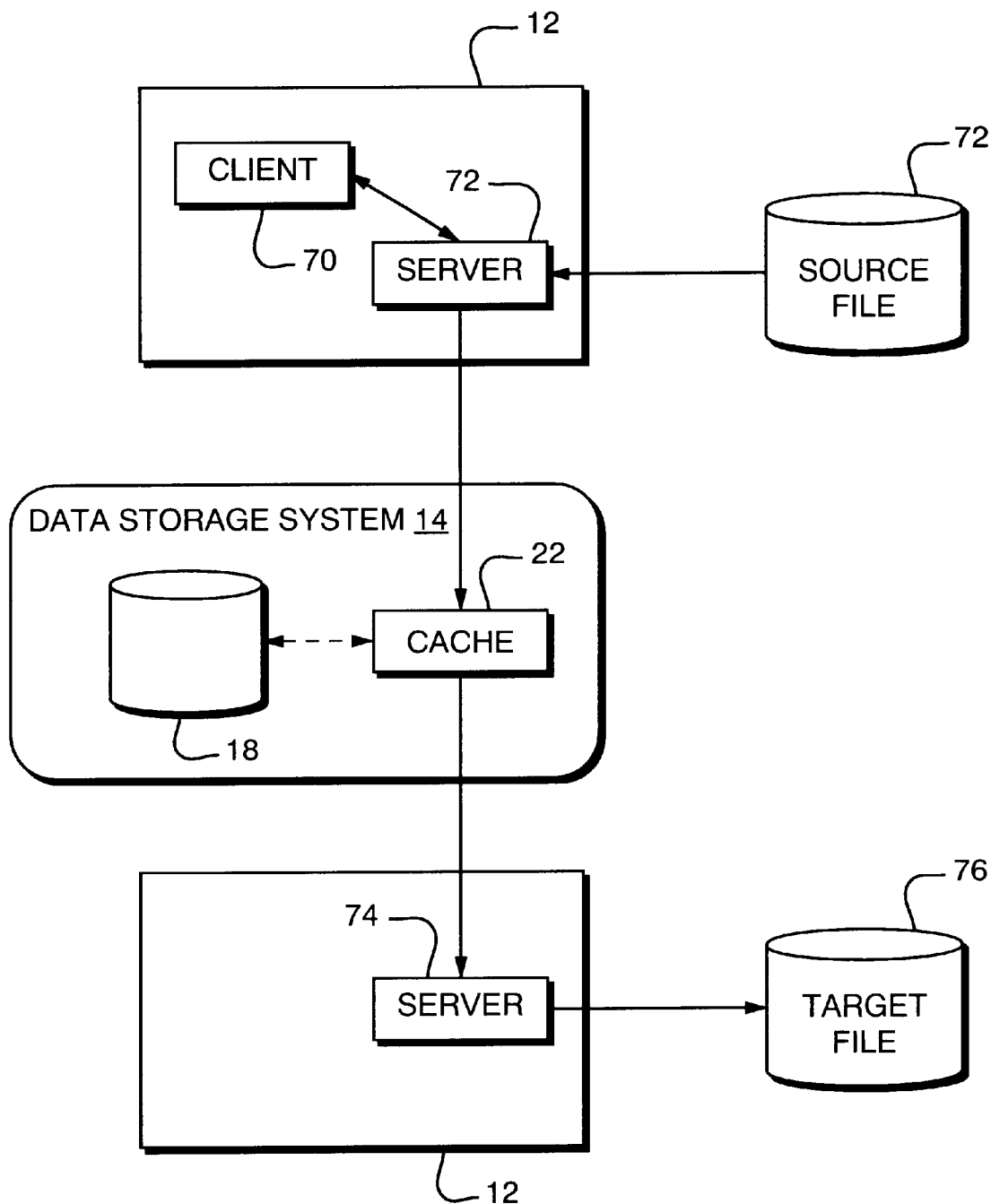
FIG. 3 shows the general architecture of the FTS.

Referring to FIG. 3, the overall system architecture is a variation of the client-server architecture. The present architecture could more accurately be called client-server-server because the FTS software which is installed on both host processors must implement at least one client 70 and two servers 72 and 74 in the file transfer environment. The client 70 makes a file transfer request, e.g. the client requests the transfer to a target file 76 of the contents of a source file 78 that is under the control of the other server 74. The server processes the request. The source and target files 78 and 76 are typically located in other storage devices, e.g. disks, that are local to the respective host processors. The file transfer occurs through the data storage system which acts as a staging buffer and transport medium for the data. In the described embodiment, all the data is placed in the high speed cache of the data storage system and thus the data transfer occurs at maximum speed.

A user interface, that allows input of various operator commands, is a command line on the host terminal. The commands, a relevant subset of which are shown in Appendix A, manage file transfers and send messages between the local and remote system nodes. The FTS client on that host processor interprets the FTS commands and then sends a transaction to the FTS server on the same host processor. The FTS server manages the request to transfer the data.

File Transfer Utility on Disk Structures

The FTS uses a set of data structures on one of the transfer disks, called the master device, to handle requests for file transfer and to coordinate the use of transfer buffers between the initiating and connecting server processes during a file transfer. These structures start at block 5 on the master device, with block 4 zeroed as a precaution. As indicated, the structures include:

Master Control Block
Process (connection) Id Table
Secondary Device Table
Process Segment Pointer Table(s)

The data storage system itself does not understand these control structures. They are a construct of the file transfer software itself. The data storage system simply presents a blank disk on which to store them. Each of the data structures will now be described in detail.

Master Control Block

The Master Control Block keeps basic information regarding where the other data structures and transfer buffers are laid out on the disks. Among other things, it contains pointers to all the other disk structures used by the FTS. By default, this structure is written to block 5 on the master device.

The fields of the Master Control Block are shown in FIG. 4. The following is a description of fields and their functions.

A blk5_id field is provided for identifying whether the device on which the block is stored is a master device or a secondary device. A secondary device is kept on another disk, though it is not used in the described embodiment.

A blk5_dev_id field is provided for identifying the entry number of the master device in the secondary device table.

A blk5_seg_size field is provided for specifying the size of the transfer segment in blocks. In other words, this specifies the size of the transfer buffer, i.e., the buffer that is available for the actual file transfer operations.

A blk5_version field is provided for specifying the version number of the Master Control Block structure.

A blk5_time_id field is provided for specifying the creation time of the master control block. A A blk5_tot_seg_num field is provided for specifying the total number of transfer segments that are available on the disks. This is a function of the number of disks that were provided (i.e., the number of buffers).

A blk5_process_id_table_ptr field is provided for storing a pointer to the start of the Process Id Table structure.

A blk5_secondary_device_table_ptr field is provided for storing a pointer to the start of the Secondary Device Table structure.

A blk5_secondary_device_entrynum field is provided for specifying the number of entries in the Secondary Device Table (i.e., the number of disks that are used). Note that the secondary devices are disks.

A blk5_start_process_segment_ptr field is provided for storing a pointer to the start of the Process Segment Pointer Table structures.

A blk5_max_connections field is provided for specifying the maximum number of concurrent connections that are allowed for a file transfer.

A blk5_mast_sec_start_segment_ptr field is for storing a pointer to the start of the data segments.

A blk5_ptr_seg_per_process field is provided for identifying the number of segments per process (i.e., per file transfer connection).

A blk5_maxptr field is provided for specifying the maximum number of segments per process. In the described embodiment, the values stored in the blk5_maxptr field and the blk5_ptr_seg_per_process field are the same, though they need not be.

A blk5_unix_filename field is provided for storing the UNIX file name of the master device.

Process (Connection) ID Table

The Process ID Table is actually used to solicit and acknowledge connections between the initiator server and the connection server. This is the only table on which locking is performed. It is locked for a short period of time at the start of a file transfer connection while the initiator process writes its data into an open entry within the table.

The fields of the Master Control Block are shown in FIG. 5. The following is a description of those fields and the uses to which they are put.

A pro_process_id field is provided for identifying the connection or slot number to which the host is connected.

A pro_flag_process field contains a set of flags including a PRO_FLAG_ALLOCATED flag, a PRO_FLAG_PROCESSING flag, and a PRO_FLAG_MVS flag. The PRO_FLAG_ALLOCATED flag is used to indicate whether the entry is allocated, the PRO_FLAG_PROCESSING flag which is used by a connector process to acknowledge a connection request and to thereby establish a connection, and the PRO_FLAG_MVS flag is used to indicate whether the requestor process is running MVS.

A pro_con_rc field is provided for storing status codes which are used to pass various status information between the two processes.

A pro_requestor field is provided for indicating the name of the requestor (i.e., initiator) process. When the host processes are started, they are given an arbitrary name (e.g. up to 8 characters). It is this name which is used here.

A pro_requestor_password field is provided for storing an optional password for the requestor process.

A pro_requestor_type field is provided for indicating the OS type of the requestor process. The values for OS types are: PRO_TYPE_UNIX which indicates that it is UNIX type; PRO_TYPE_TEXT, which indicates that it is text type; PRO_TYPE_NT which indicates that it is a Windows NT type; PRO_TYPE_TPF, which indicates that it is IBM's Transaction Processing Facility; and PRO_TYPE_UNKNOWN, which indicates that its type is unknown.

A pro_requestee field is provided for indicating the name of the requestee (i.e., connector) process.

A pro_requestee_type field is provided for indicating the OS type of requestee process.

A pro_dtd field is provided for holding a command structure for initiator to connector communications.

A InitM field is provided for storing a command structure for connector to initiator communications.

In host processors which use a UNIX operating system the TCP/IP protocol is used for client to initiator communications. However, since not all operating systems support this protocol, another mechanism, which utilizes the pro_dtd and InitM fields, is provided which is a variant of the initiator/connector protocol. This alternative mechanism allows, for example, a client on an MVS system to write its command requests to the initiator by writing them to an appropriate one of these fields. There is a secondary polling taking place according to which the initiator looks in the Process Id Table for communications from the client. The pro_dtd field is used for initiator to connector communications and the pro_InitM field is used for connector to initiator communications.

Secondary Device Table

The secondary device table contains information about where the data segments are located on each transfer device and is used by the processes to keep track of those data segments. All data segments are numbered from 1 to however many there are.

The fields of the Secondary Device Table are shown in FIG. 6 and the following is a description of those fields and the uses to which they are put.

A sec_dev_id field is provided for storing the identity of the device on which the segments are located. This information comes from a configuration file that is generated when the ICDA is set up.

A sec_str_seg_ptr field is provided for storing a pointer to the start of the data segments on the device that is identified in the sec_dev_id field.

A sec_seg_number_for_device field is provided for specifying the number of data segments that are included on the device.

A sec_start_segment_number field is provided for specifying the segment number of the first segment on the device.

Process Segment Pointer Table

There are two process segment pointer tables for each process. Logically, the two Process Segment Pointer Tables are circularly linked lists. One process segment pointer table points to the segments that are used for initiator to connector communications; and the other process segment pointer table points to the segments that are used for connector to initiator communications. These two tables are the primary players in the transfer protocol. That is, once the transfer begins, it is this table that provides the primary control and synchronization of the file transfer.

In order to avoid having to lock the transfer devices, the initiator, as a rule, writes only to an initiator-to-connector Process Segment Pointer Table and the segments pointed to by it. The connector writes only to a connector-to-initiator Process Segment Pointer Table and the segments pointed to by it. Both processes step through the tables in order, looping back to reuse the first entry when the end of the table is reached. In effect, this creates a pair of circular buffers for communications. In the described embodiment, the number of entries in each Process Segment Pointer Table is 640.

The fields of the Process Segment Pointer Table are shown in FIG. 7 and the following is a description of those fields and the uses to which they are put.

A ptr_process_segment_ptr field is provided for storing a number identifying the logical address of the data segment (i.e, transfer buffer) containing the data. The Secondary Device Table is used to translate this number to an actual physical location at which the data is stored in the ICDA. The physical location will include the identity of the device and the offset from the first segment on that device.

A ptr_process_segment_flg field includes a set of flags which are used to indicate the current status of the segment. One of the flags is used to indicate whether there is valid data in the segment, another flag is used to indicate whether the data in the segment has been read, and a third flag is used to indicate that it is the last data segment. The field also includes other bit flags that are used to pass status information-between the connected servers.

A ptr_process_block_seq field is provided for storing a sequence number that is inserted by the process that is responsible for writing to this particular table. This sequence numbers which represent a running count are generated in sequential order by a counter until sufficient segments have been provided to write all of the file data into the transfer buffer.

A ptr_process_req_id field is provided for storing another smaller sequence number that is also inserted by the process. These numbers are also generated in sequential order by another counter, modulo 16. In other words, it is a shorter running count. As will become clearer in the following description, the sequence numbers in this field and the previous field are used to make sure that the initiator and connector processes both remain in lock step while file data is being transferred from the writing process to the reading process.

A ptr_process_blk_read field is provided for specifying the size of a segment in blocks. This number is determined at the time of initialization.

File Transfer Protocol

A format program which is run before the file transfer protocol allocates space on the transfer disks and creates and writes out the control structures.

Creating a Transfer Process (Connection)

To set up for a file transfer (or a series of transfers), the initiator process running on one system first uses the Process Id Table to request a connection to an identified connector process. And the connector process, typically running on another system, uses the Process Id Table to acknowledge a connection between the initiator process and the connector process.

Figure 8:
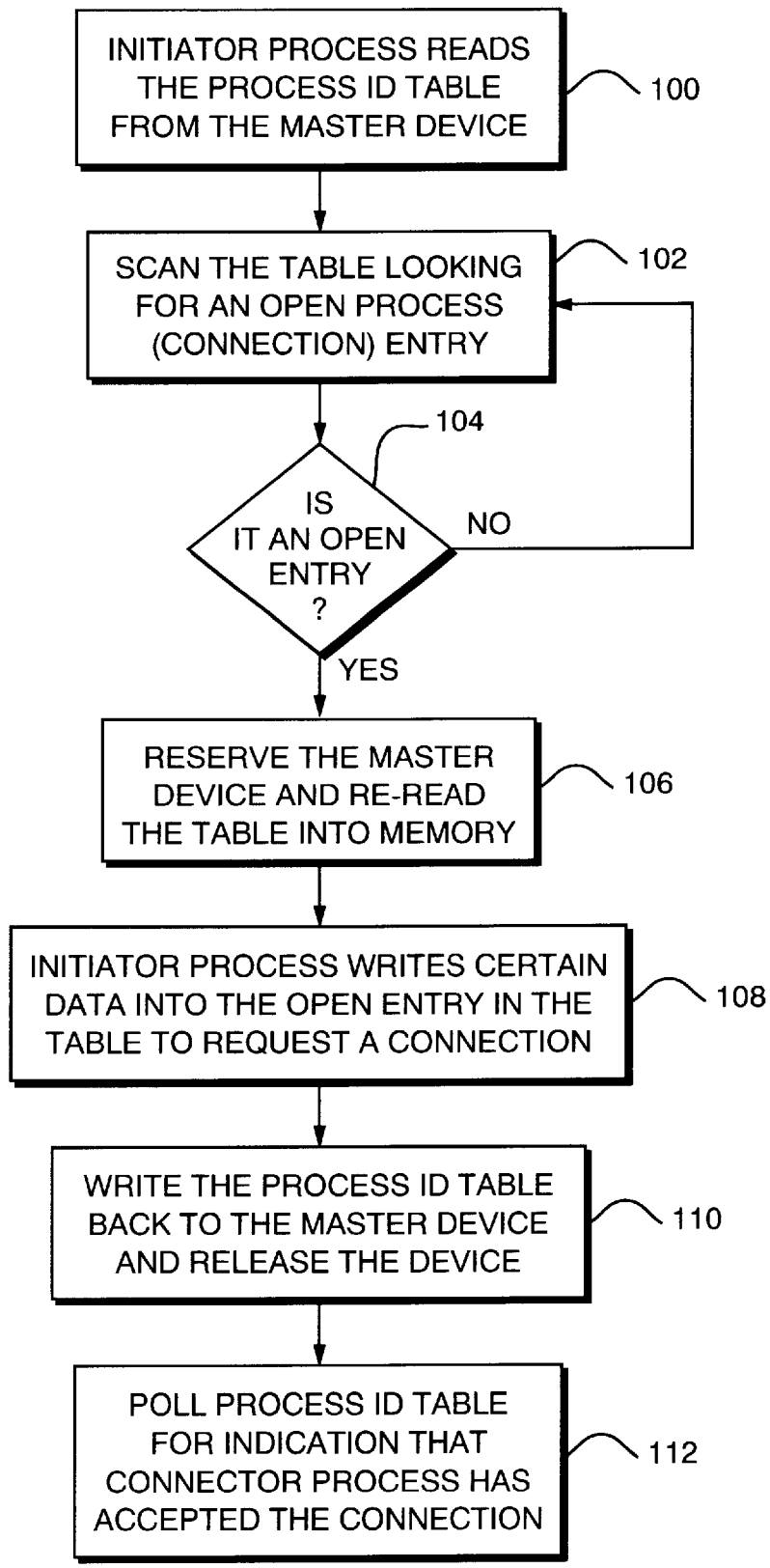
FIG. 8 is a flow chart of the operations that are performed by an initiator process in creating a transfer process (i.e., a connection)

The procedure for establishing the connection is shown in FIG. 8.

First, the initiator process reads the Process ID Table from the master device (step 100) and scans the table looking for an open process (connection) entry (step 102). It does this by checking whether the PRO_FLAG_ALLOCATED flag in the pro_flag_process field is cleared (step 104). If it is, it is an open entry. If the entry is not open, the initiator process continues scanning for an open entry.

When it finds an open entry, it then reserves the master device and re-reads the table into its memory (step 106). This assures that it is using the most up-to-date version and that no other process can inadvertently interfere with the request that is to be made. With the reread version that is now in the system's local memory, the initiator process then writes certain data into the open entry in the table that is necessary to request a connection (step 108). That is, it writes into the pro_requestee field the name of the transfer server process to which it desires a connection, it writes its own name into the pro_requestor field, and it writes its OS type into the pro_requestor_type field in the open slot in the Process Id Table. The initiator also sets the PRO_FLAG_ALLOCATED bit in the pro_flag_process field to notify other processes that this entry of the table is now being used. After it has written this information into its copy of the Process Id Table, it then writes the Process Id Table back to the master device and releases the device (step 110).

The Process Id of the requested connection becomes the Process Id Table entry number (1-based) that is found in the pro_process_id field.

After the Process Id Table has been written back to the master device, the initiator process periodically polls the Process Id Table waiting for an indication that the identified connector process has accepted the connection request, thereby establishing a connection (step 112).

Figure 9:
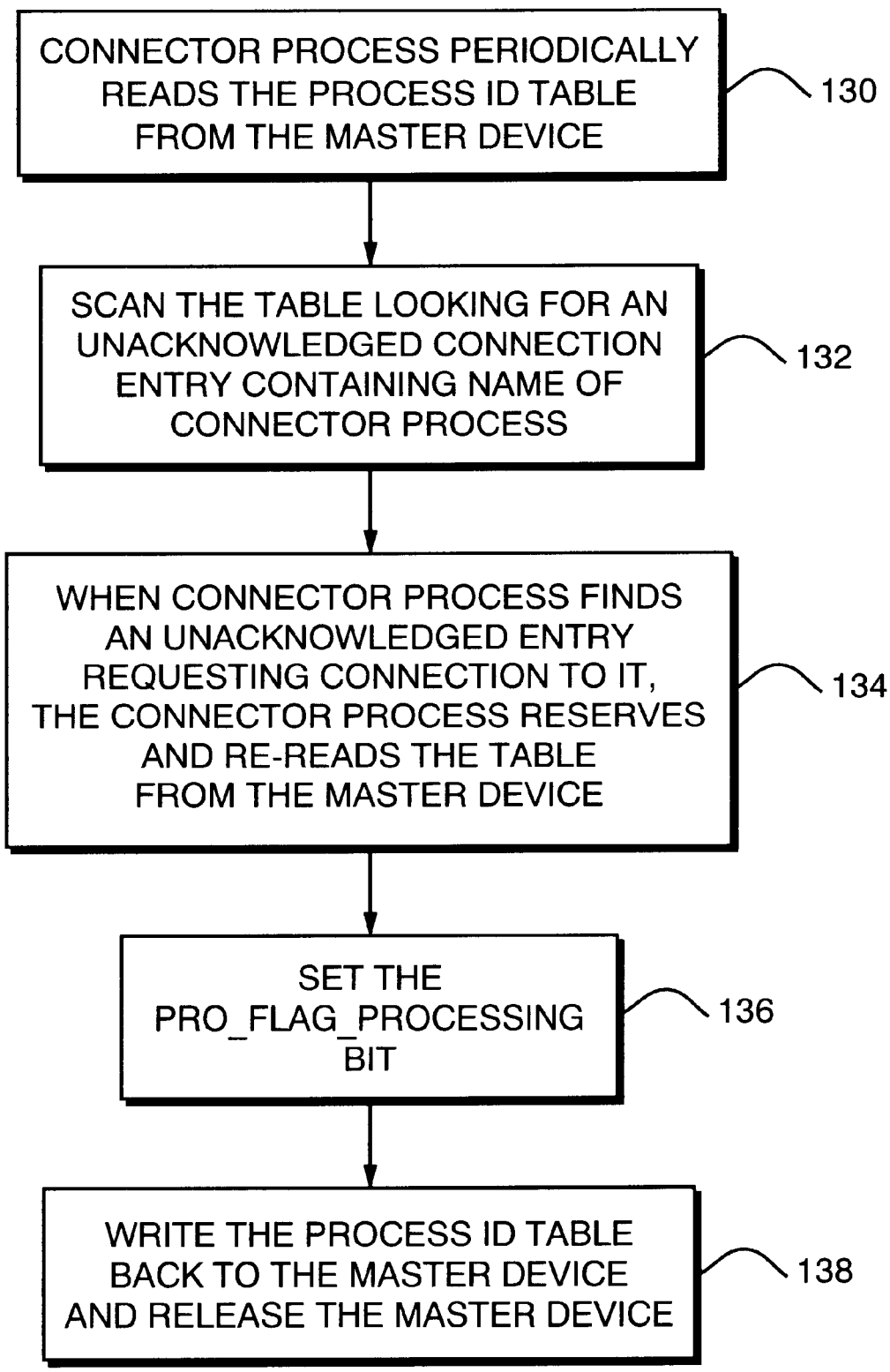
FIG. 9 is a flow chart of the operations that are performed by the connector process in establishing a connection.

Referring to FIG. 9, each of the other processes that have been established periodically reads the Process Id Table from the master device (step 130) and scans the table looking for an unacknowledged connection entry containing its name (step 132). In the described embodiment, the polling frequency is about every second though other polling frequencies can also be used. When it finds such an entry, it reserves the master device and re-reads the table from the master device (step 134). The connector process then accepts the request for a connection by setting the PRO_FLAG_PROCESSING bit in the pro_flag_process field of the appropriate table entry (step 136) and then it writes the Process ID Table back to the master device and release the master device (step 138).

When the connector writes an acknowledgment, the initiator will see it and then confirm to the client that an open link has been established.

It should be noted that the resources needed to handle transfers are effectively reserved as soon as the initiator writes the Process Id Table back to the master disk. Thus, the FTS can actually proceed with writing data or commands to the data segments before the connector process has accepted the connection.

Transferring File or Command Data

The actual transfer process, by using paired Process Segment Pointer Tables and associated buffers to avoid two processes having to write to the same structure, is designed to be contention free. The initiator process writes to its copy of the Process Segment Pointer Table and transfer buffers and reads from the connector's copy of the Process Segment Pointer Table and transfer buffers. Similarly, the connector process writes to its copy of the Process Segment Pointer Table and transfer buffers and reads from the initiator's copy of the Process Segment Pointer Table and transfer buffers. The two processes move sequentially through their segment pointer tables in a form of modified lock-step. If the end of the Process Segment Pointer Table is reached, the process wraps around to the beginning of the table. At startup and at the end of processing each command, the initiator and connector processes clear their respective Process Segment Pointer Tables and set their respective index counters to zero, so that on the next command both processes start from the beginning of their respective tables.

In the following description, we refer to "reading" and "writing" processes rather than to initiator and connector processes. This is because they can swap roles depending on which direction data to flowing. For example, the client can do a PUT or a GET command. The PUT command is used to send a file to the other host and the GET command is used to retrieve a file from the other host. Thus, data will flow in one direction or the other and the use of the Process Segment Pointer Tables flips depending upon which command is used. That is the reason a distinction is made between initiator/connector as well as between reader/writer. An initiator can be either a reader or a writer.

Writing Process

Figure 10A:
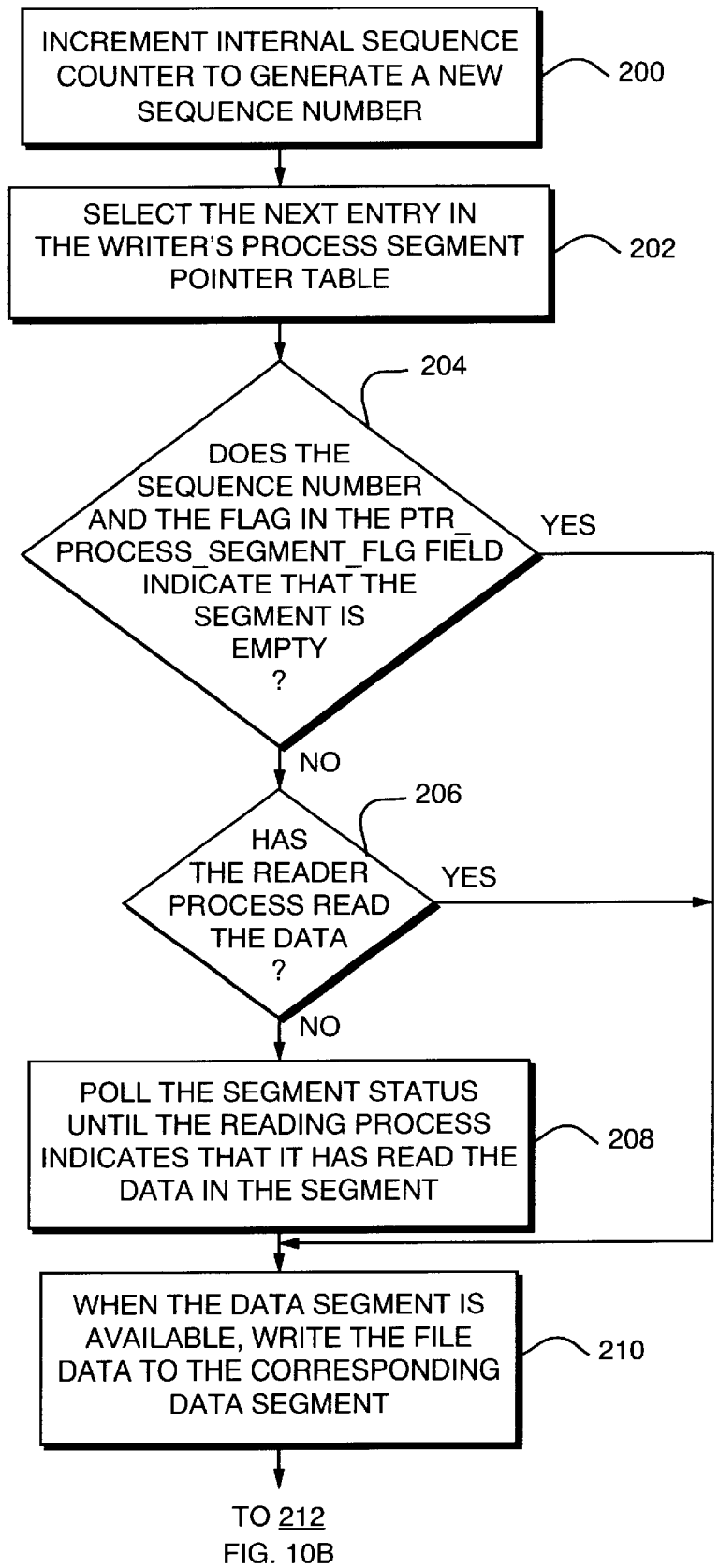
FIG. 10 is a flow chart of performing a writing process.
Figure 10B:
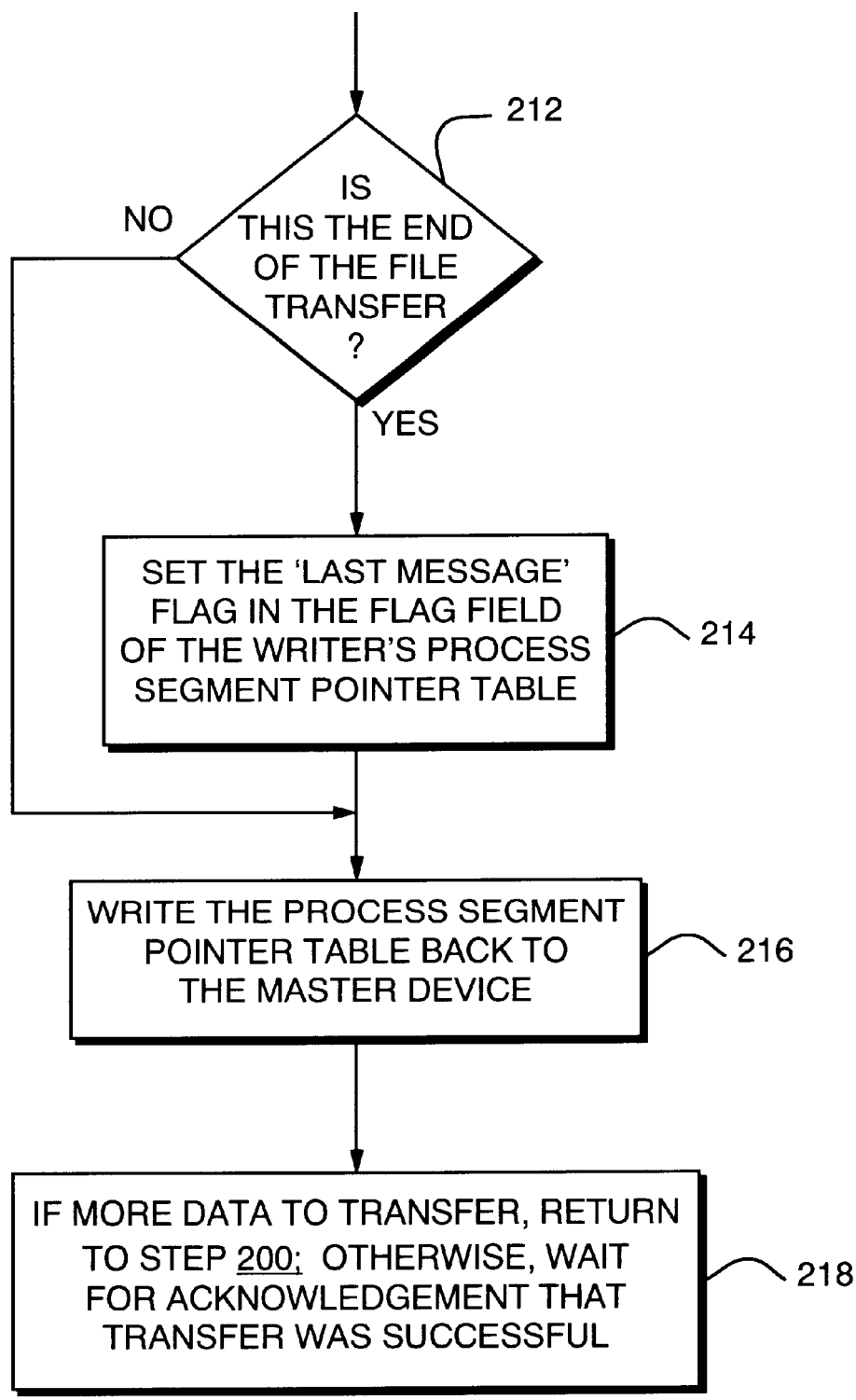

Referring to FIG. 10, the writing process increments its counter to generate a new sequence number (step 200), it selects the next entry in its Process Segment Pointer Table (step 202), and it determines if that next entry is available (step 204). The writing process makes this determination by checking the appropriate flag in the ptr_process_segment_flg field. If the sequence number is zero and the flag field indicates that the corresponding segment has not yet been used during this connection (i.e., is empty), then it is available for a data or command transfer and the writing process writes data to the available segment (step 210).

On the other hand, it is possible that the writing process has already written to all of the transfer buffers and thus the data segments will not be empty, e.g. the sequence number is nonzero and/or the flag indicates that there is valid data in the segment. In that case, the writing process reads the corresponding entry in the reader's Process Segment Pointer Table, i.e., the entry found by the sequence number, to see whether the reader process has read the data yet (step 206). If the reader has read the data, this will be indicated by the relevant flag in the ptr_process_segment_flg field. Note that the flag field in the reader's Process Segment Pointer Table is set to 0×40 if the writer is the initiator process, and it is set to 0×80 if the writer is the connector process.

If the segment is "busy", i.e., contains valid data that has not yet been read, the writing process polls the segment status until the reading process indicates that it has read the data in the segment (step 208). If the segment is available, the writing process references the Segment Device Table to determine the physical location of the data segment that is identified by the first field (i.e., the ptr_process_segment_ptr field) in the current entry of the Process Segment Pointer Table and then writes its data to that data segment, along with some header information that is used for error checking, i.e., checking that the writing and reading process remain in lock step (step 210). It also sets the flag and writes the sequence numbers into the sequence number fields to indicate that new data has been written to the data segment.

The information that is copied into the header of the transfer buffer includes the segment sequence number and the process request sequence number, both of which were generated by the writing process for this particular segment. It may also include a time stamp and other information which may be used by the reading process that the data segment which is read contains the information that was expected. That is it is used as a cross check on the transfer.

If the writing process has completed the file transfer, it will also indicate the end of a file transfer by setting a "last message" flag (0×20) in the flag field of its Process Segment Pointer Table. After doing that, the writing process will periodically poll its own Process Segment Pointer Table waiting for the reading process to signal its completion of reading the data. The reading process signals its completion by cleaning up (i.e., clearing) both Process Segment Pointer Tables, thereby causing the flag field in the first entry to be zeroed. Once the flag field is zeroed, if the writing process is the connector, it then starts polling the Process Id Table, waiting for another command from the initiator process.

After the writing process writes its data to the transfer buffer, it lets the reading process know that new data is ready by writing its Process Segment Pointer Table back to the master device (step 216). If there is more data to be transferred, the writing process will return to step 200 where it increments its internal sequence counter and repeats the above-identified process; otherwise, it will simply wait for the reading process to signal its completion of the file transfer (step 218).

Note that the writing process can be configured to write several data segments before actually writing its segment pointer table back to disk. This option, which is referred to as a multi-buffer read/write scheme, is implemented by setting the parameter specified in the blk5_ptr_seg_per_process field in the Master Control Block to a number greater than one. The multi-buffer read/write scheme can be used to reduce I/O overhead to the master device.

The writing process can be programmed to write a number of transfer segments before updating its process segment pointer table. The parameter which sets the number of segments that can be written at one time is set by an external parameter. If that parameter is set to n≠0, the connector will write n buffers or until it reaches the end of the file. The reading process also knows that it can read n buffers before it needs to update its process segment pointer table.

There is an inherent blocking mechanism built in to the transfer protocol. Eventually, for large enough files, the writing process will wrap around to the end of the chain of buffers. At that point if the reading process has not yet read any of the transfer buffers, the writing process will block, i.e., it will not be able to write any more data to the transfer buffers until the reading process signals that it has read the buffers which are now needed by the writing process. If the writing process were to write more before receiving that signal, it would overwrite data in buffers that have not yet been read. During a block, the writing process polls until it sees that new buffers have been freed up.

It should also be noted that one of the processes, e.g. the writing process prior to beginning the file transfer, can optionally turn off the destaging feature of the data storage system. Thus, during the file transfer, none of the data written to cache will be destaged to a disk and thus cause the transfer to slow down. That is, by turing off the destaging feature, the entire transfer can be caused to take place using only the much faster cache memory.

Reading Process

Figure 11A:
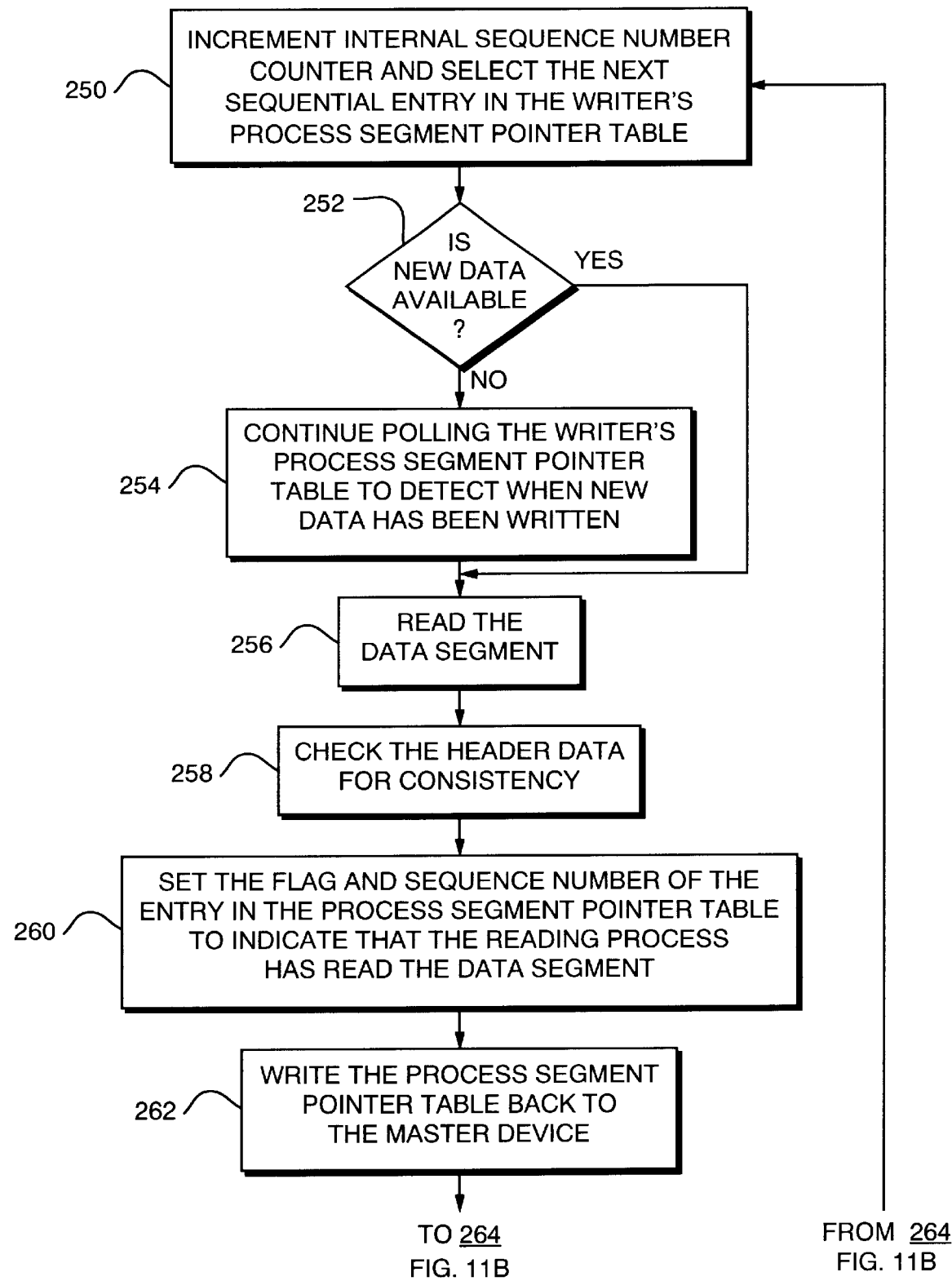
FIG. 11 is a flow chart of performing a reading process.
Figure 11B:
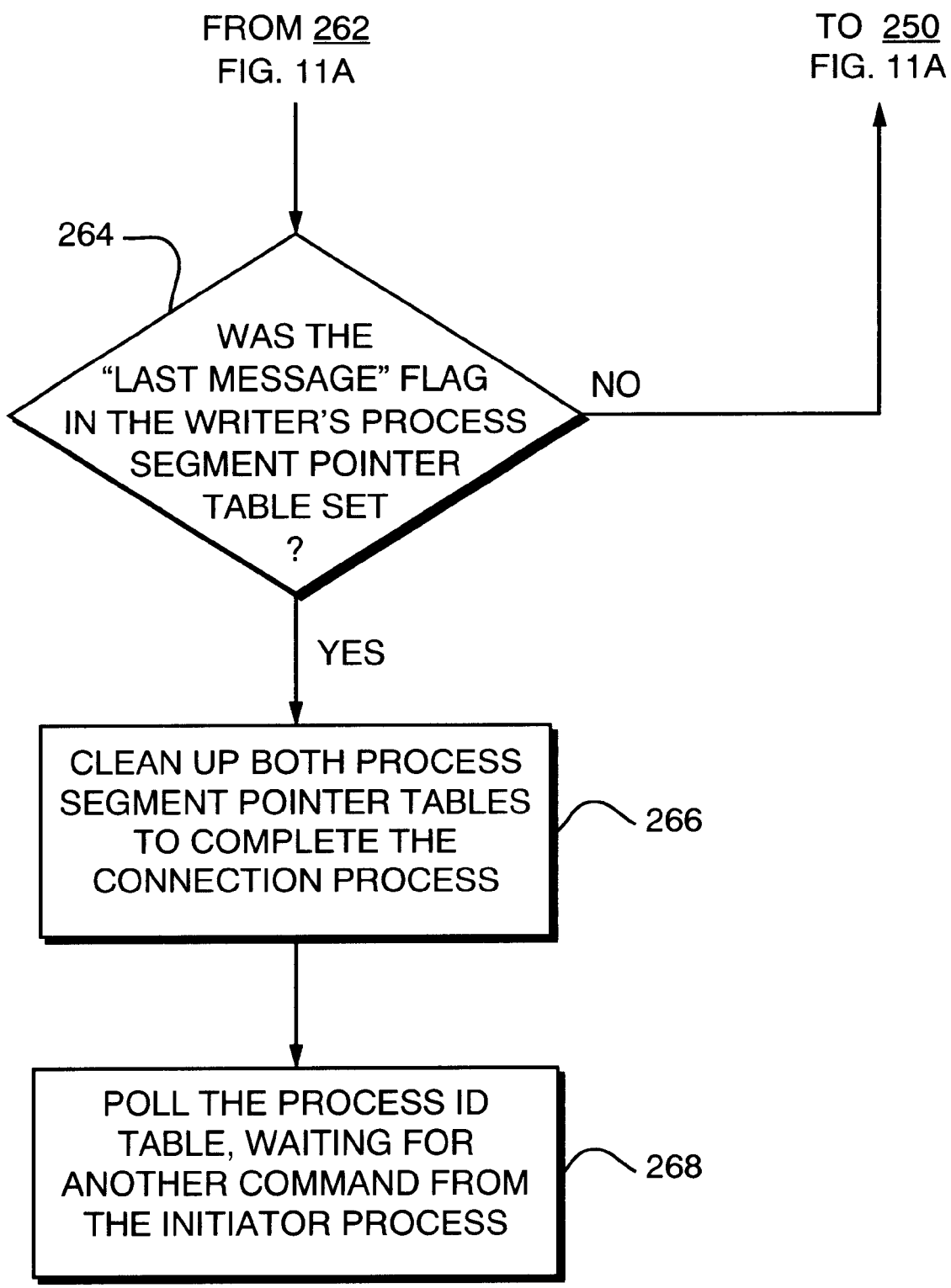

Referring to FIG. 11, the reading process increments its internal counter to generate the next sequence number, selects the next sequential entry in the writing process' Process Segment Pointer Table (step 250) and checks whether new data is available (step 252). This will be indicated by the flag field in the writer's Process Segment Pointer Table being set to 0×40, if the reading process is the initiator, or being set to 0×80, if the reading process is the connector, and by the sequence number from the internal counter equaling the sequence number in the writer's Process Segment Pointer Table entry.

If no data is available, the reading process continues to poll the writer's Process Segment Pointer Table, waiting for new data to be written (step 254).

If data is available, the reading process reads the data segment (step 256) and checks the header data for consistency (step 258). If the header information is consistent, the reading process sets the flag and the sequence number of the corresponding entry in it's Process Segment Pointer Table to indicate that it has read the data segment (step 260).

To check the header for consistency, the reading process compares the stored segment sequence number and process request sequence number with the values generated by the counters in the reading process. The numbers should be the same if the data segment is the correct data segment. If the numbers do not match, that is an indication that a desequencing error has occurred, i.e., the writing process and reading process have gotten out of synchronization and that the data segments are not being read in the order that was intended. Under those circumstances, the file transfer is rolled back so as to restart from a point at which the sequencing was correct and retransmit the data from that point.

To let the writing process know that the data has been read, the reading process then writes its Process Segment Pointer Table back to the master device (step 262). As with the writing process, the reading process can also read several segments before writing its Process Segment Pointer Table back to disk, thereby reducing overhead I/O.

If the "last message" flag in the writer's Process Segment Pointer Table is set (step 264), the reading process cleans up both Process Segment Pointer Tables to complete the connection process (step 266). The clean up of the Process Segment Pointer Tables involves clearing or zeroing the contents of the ptr_process_segment_flag, the ptr_process_block_seq, and the ptr_process_req_id fields. If the reading process is the connector, it then starts polling the Process Id Table, waiting for another command from the initiator process (step 268).

As should be apparent from the above description, both the writing process and the reading process walk through the Process Segment Pointer Table in sequential order. However, the actual data segments may be laid out in any order on the devices. There are several possible schemes for distributing the transfer buffers across the disks. In the described embodiment, the distribution is randomized. Alternatively, a standard sequential stripping could be used or they could be distributed in chunks so that all buffers for a given connection are on one disk. The invention is not meant to be limited by the approach that is used in distributing the transfer buffers across the devices.

Effectively, an FTS server process can be in one of two modes, either command transfer mode or file transfer mode. In the command transfer mode, the initiator process is waiting for the user to issue a request, while the connector process is polling and waiting for a command to be passed in the first data segment via the transfer disk. In the file transfer mode, one server will be sending a series of data segments via the transfer devices, while the other server loops, reading the data segments until one segment arrives with a "last message" flag, indicating the end of the transfer. At that point, both processes drop back to command mode.

The transfer protocol is itself indifferent as to whether it is a command or data that is being sent. The process at either end knows that a command has been sent based upon situational information. In other words, if no file transfer is occurring or has been requested, then the connector when first notified of a transfer will assume that a command is being transferred. If a process sends a command, then it will assume that the information that is coming back from the target is a response to the command. Once a connection is established, both process will treat the information that is being transferred as part of the file transfer process at least until an end of file indication is sent. If connection has not received anything for awhile, it will assume that the next thing that it receives will be a command.

It should also be appreciated that the use of the two Process Segment Pointer Tables actually permits duplex communication, if that is desired. Also with the FTS one can implement multiple concurrent point-to-point file transfers. This includes the possibility of multiple processes running on a single host opening connections to multiple processes.

The principles of the underlying protocol can be used for any kind of transfer, not just file transfers as described herein. For example, one could build a network socket interface on top of the protocol for sending data over the Internet. Or it could also be used to implement a variation of the UNIX SEND/RECEIVE commands for bulk transfer of data from one process to another.

Appendix A

The commands listed below are used to work with and transfer data. The commands are entered either from an MVS terminal or a UNIX workstation, depending on the operating system.

open server_name

The open command creates a connection to a remote host server (i.e., server_name).

get source_file target_file

The get command is used to copy a file from the remote host to the local host.

Source_file is the full path name of the file on the remote host and target_file is the fully associated path name of the location name on the local host to which the file will be copied.

put source_file target_file

The put command is used to copy a file from the local host to the remote host.

Source_file is the full path name of the file on the local host and target_file is the fully associated path name of the location/name on the remote host to which the source file will be copied.

replace get(put) source_file target_file

The replace command is used to replace (overwrite) the existing output file on the receiving host when followed by entry of the get or put command.

dir [name]

The dir command is used to obtain a list of directory entries or a list of files in a file group on the remote host, or a list of the members of the partitioned data set, as well as auxiliary information about the files cd directory The cd command is used to change the working directory or file group on the remote host.

close

The close command is used to terminate the connection to a remote server.

quit

The quit command is used to disconnect from the remote host and end the client.

Other embodiments are within the following claims.

What is claimed is:

1. A method of communicating and transferring information from a first process to a second process, each of which is running on a corresponding different one of first and second external processors, each processor having its own operating system which is different from the other processor's operating system, and both of which first and second external processors are connected to a data storage system that is separate from a first and second external processors, the data storage system including a data storage medium that has a shared storage region that is accessible by both the first and second processes, said method comprising:

establishing a data transfer channel between the first and second copending processes through the shared storage medium of the data storage system; and by using the data transfer channel established in the data storage system, transferring information from the first to the second copending processes.

2. The method of claim 1 further comprising:

defining areas within the shared storage region that are used to implement a set of control structures and a plurality of transfer buffers;

wherein the step of establishing the connection between the first and second processes includes using the set of control structures to establish the data transfer channel;

wherein the step of transferring information between first and second processes involves transferring the information through the plurality transfer buffers.

3. The method of claim 2 wherein the step of transferring information through the transfer buffers comprises:

through the first process, writing data to the plurality of transfer buffers;

through the second process, reading data that was written to the transfer buffers; and using the control structures to synchronize the writing and reading steps.

4. The method of claim 1 wherein the data storage system includes a cache memory, a disk storage unit, and a controller which destages data from the cache memory into the disk storage unit, said method further comprising:

using the cache memory for establishing the data transfer channel and sending information; and disabling the destaging function of the controller for the shared storage region.

5. A method of transferring information in a system that includes a first external processor and a different, second external processor, each processor having its own operating system which is different from the other processor's operating system, both of which are connected to a common data storage system and that share a region of storage within the data storage system, the method comprising the steps of:

defining areas within the shared storage region that are used to implement a set of controlled structures and a plurality of transfer buffer;

using the control structures to establish a data transfer channel from a first process running on the first processor to a copending second process running on the second processor, said data transfer channel being through the shared storage region of the data storage system; and after establishing the data transfer channel, transferring information from the first process to the second process through the transfer buffers, wherein the step of transferring information to the transfer buffers comprises:

through the first process, writing data to the plurality of transfer buffers;

through the second process, reading data that was written to the transfer buffers; and using the control structures to synchronize the wiring and reading steps.

6. The method of claim 5 wherein the set of control structures includes a first data structure and a second data structure, wherein the step of establishing the data transfer channel uses the first data structure and the steps of using the control structures to synchronize the writing and reading uses the second data structure.

7. The method of claim 6 wherein the step of establishing the data transfer channel comprises:

adding identifiers of the first and second processes to the first data structure; and setting a first flag in the first data structure to indicate that the first process is requesting that the data transfer channel be established with the second process.

8. The method of claim 7 wherein the step of establishing the data transfer channel further comprises:

prior to the adding and setting steps, reading the first data structure from the shared storage region into a first local memory, said first local memory being remote from the data storage system and local to the first processor on which the first process is running; and after the adding and setting steps, writing the first data structure back to the shared storage region.

9. The method of claim 8 wherein the step of establishing the data transfer channel further comprises:

prior to reading the first data structure from the shared storage region into the first local memory, locking a portion of shared storage region in which the first data structure is stored;

after writing the first data structure back to the shared storage region, unlocking the portion of shared storage region in which the first data structure is stored.

10. The method of claim 6 wherein the second data structure comprises a first table that includes a plurality of records each of which identifies a corresponding transfer buffer in the plurality of transfer buffers and wherein the step of using the control structures to synchronize the writing and reading steps comprises:

selecting a record among the plurality of records; and performing a first sequence of steps comprising:

determining whether the transfer buffer which corresponds to the selected record is available to receive data;

if the transfer buffer which corresponds to the selected record is available to receive data, causing the first processor to perform the step of writing data to the plurality of transfers buffer by writing data to the transfer buffer which corresponds the to selected record; and setting a first flag in the selected record to indicate that data has been written to that transfer buffer which corresponds to the selected record.

11. The method of claim 10 further comprising selecting a next record among the plurality of records in the first table and for the next selected record performing the first sequence of steps.

12. The method of claim 11 further comprising repeating the steps of selecting a next record and performing the first sequence of steps until all data that is available for transfer has been written to the plurality of transfer buffers.

13. The method of claim 10 wherein the step of using the control structures to synchronize the writing and reading steps further comprises:

through the second processor, polling the first table to determine when the first flag has been set;

upon detecting that the first flag has been set, causing the second processor to perform the step of reading data that was written to the transfer buffers by reading the data that was written to the transfer buffer which corresponds to the selected record; and setting a second flag in the second data structure to indicate that the second processor has read the data that was written to the transfer buffer which corresponds to the selected record.

14. The method of claim 13 wherein the second data structure comprises a second table and the second flag is in the second table.

15. A data storage system for handling a file transfer between a first process and a second process, each of which is concurrently running on a corresponding different one of first and second external processors both of which first and second external processors are connected to the data storage system, said data storage system comprising:

a shared storage region to which both the first and second processes share access;

a set of control structures implemented in the shared storage region; and a plurality of transfer buffers implemented in said shared storage region, wherein the set of control structures includes a first table which serves to establish and support a file transfer channel between the first and second processes and through the shared storage region, and a second table which serves to coordinate use of the plurality of transfer buffers during a transfer of the file from one of the first and second processes to the other of the first and second processes.

16. A computer program being readable on a computer-readable medium, said program for running a first processor which is connected to a data storage system to which a different second coprocessor is also connected, each processor having its own operating system which is different from the other processor's operating system, said data storage system being separate from and external to the first the second processors and including a share stored region which is shared by both the first and second processors, said program comprising instructions enabling in able to first processes running on the first processor to perform the functions of:

by writing first data to the shared storage region, requesting that a data transfer channel be established through the shared storage region in the data storage system to a copending second process running on the second processor; and using the data transfer channel through the shared storage region to transfer information from the first to the copending second process.

17. The computer program of claim 16 wherein said program further comprises instructions for causing the first processor to perform the function of:

defining areas within the shared storage region that are used to implement control structures and a plurality of transfer buffers;

wherein the instructions for causing the first processor to perform the function of requesting comprise instructions for causing the first processor to perform the function of writing an identifier of the second process to the control structures to request the data transfer channel;

wherein the instructions for causing the first processor to perform the function of using the data transfer channel through the shared storage region to transfer information between the first and second processes comprise instructions for causing the first processor to perform the function of sending the information to the second process via the plurality of transfer buffers.

18. The computer program of claim 16 wherein said program further comprises instructions for causing the first processor to perform the function of:

defining areas within the shared storage region that are used to implement control structures and a plurality of transfer buffers;

wherein the instructions for causing the first processor to perform the function of requesting comprise instructions for causing the first processor to perform the function of writing an identifier of the second process to the control structures to request the data transfer channel;

wherein the instructions for causing the first processor to perform the function of using the data transfer channel through the shared storage region to transfer information between the first and second processes comprise instructions for causing the first processor to perform the functions of:

sending a block of the information to the second process by writing the block of information to the plurality of transfer buffers;

notifying the second process via the data storage system that the block of information has been written to the plurality of transfer buffers; and repeating the sending and notifying functions for subsequent blocks of the information until all of the information has been written to the plurality of transfer buffers.

19. The computer program of claim 16 wherein said program further comprises instructions for causing the first processor to perform the function of:

using the control structures to coordinate and synchronize the transfer of the information to the second process.

* * * * *